US010009049B2

(12) United States Patent
Klopfer et al.

(10) Patent No.: US 10,009,049 B2
(45) Date of Patent: Jun. 26, 2018

(54) METHOD FOR DETECTING AND HANDLING OSCILLATIONS IN A SIGNAL BOOSTER DEVICE, A SIGNAL BOOSTER DEVICE AND A MEANS OF TRANSPORTATION COMPRISING A SIGNAL BOOSTER DEVICE

(71) Applicant: KATHREIN-WERKE KG, Rosenheim (DE)

(72) Inventors: Maximilian Klopfer, Kiefersfelden (DE); Steffen Kohlhepp, Rosenheim (DE)

(73) Assignee: Kathrein-Werke KG, Rosenheim (DE)

( * ) Notice: Subject to any disclaimer, the term of this patent is extended or adjusted under 35 U.S.C. 154(b) by 0 days. days.

(21) Appl. No.: 15/230,738

(22) Filed: Aug. 8, 2016

(65) Prior Publication Data

US 2018/0041234 A1 Feb. 8, 2018

(51) Int. Cl.
*H04L 27/08* (2006.01)
*H03D 1/06* (2006.01)
(Continued)

(52) U.S. Cl.
CPC .......... *H04B 1/0458* (2013.01); *H01Q 1/243* (2013.01); *H04L 5/14* (2013.01); *H04L 43/16* (2013.01);
(Continued)

(58) Field of Classification Search
USPC ..... 375/219, 220, 222, 240, 240.26, 240.27, 375/259, 285, 294, 295, 297, 300, 298,
(Continued)

(56) References Cited

U.S. PATENT DOCUMENTS 5,095,528 A 3/1992 Leslie et al.
5,815,795 A 9/1998 Iwai
(Continued)

FOREIGN PATENT DOCUMENTS

WO WO 2013/028921 2/2013

OTHER PUBLICATIONS

Electronic Code of Federal Regulations—Signal Boosters, Title 47 6 Chapter I 6 Subchapter B 6 Part 20 6, 2.§20.21, Feb. 11, 2015, 10 pgs.

(Continued)

*Primary Examiner* — Linda Wong
(74) *Attorney, Agent, or Firm* — Nixon & Vanderhye P.C.

(57) ABSTRACT

A signal booster device comprises at least one first antenna for communicating with a mobile, at least one second antenna for communicating with a base station, at least one amplifier and at least one power detector. The signal booster device adjusts a gain between the at least two antennas by altering an amplification factor. A normal operation gain is achieved by setting the amplification factor to a first amplification factor. An oscillation is detected by determining at least one first signal power, increasing the operation gain of the signal booster device by setting the amplification factor to a second amplification factor wherein the second amplification factor is higher than the first amplification factor, determining at least one second signal power, correlating the at least one first signal power with the at least one second signal power; and determining whether a status of the signal booster device is oscillation or normal based upon the result of the correlation.

33 Claims, 7 Drawing Sheets

(51) Int. Cl.
    *H04B 1/10*     (2006.01)
    *H04B 1/04*     (2006.01)
    *H01Q 1/24*     (2006.01)
    *H04W 72/04*     (2009.01)
    *H04L 12/26*     (2006.01)
    *H04L 5/14*     (2006.01)

(52) U.S. Cl.
    CPC ..... *H04W 72/042* (2013.01); *H04W 72/0413* (2013.01)

(58) Field of Classification Search
    USPC ............... 375/316, 320, 340, 345, 344, 346
    See application file for complete search history.

(56) References Cited

U.S. PATENT DOCUMENTS

| | | | | |
|---|---|---|---|---|
| 5,883,501 A * | 3/1999 | Arakawa | .................. | G05F 3/247 323/222 |
| 7,409,186 B2 | 8/2008 | Van Buren et al. | | |
| 7,486,929 B2 * | 2/2009 | Van Buren | ......... | H04B 7/15535 455/11.1 |
| 8,583,033 B2 | 11/2013 | Ashworth et al. | | |
| 8,639,180 B2 * | 1/2014 | Cook | .................... | H04W 24/02 455/11.1 |
| 8,874,029 B2 * | 10/2014 | Van Buren | ........... | H03G 3/3042 455/11.1 |
| 2008/0014862 A1 * | 1/2008 | Van Buren | ......... | H04B 7/15535 455/7 |
| 2009/0021325 A1 * | 1/2009 | Lee | .......................... | H03H 7/40 333/124 |
| 2009/0309568 A1 * | 12/2009 | Hisano | ..................... | G06F 1/26 323/311 |
| 2010/0124140 A1 * | 5/2010 | Otsuka | ................... | G11C 16/12 365/226 |
| 2016/0028469 A1 * | 1/2016 | Ashworth | ............ | H03G 3/3042 455/17 |
| 2016/0036403 A1 * | 2/2016 | Ashworth | ............ | H03G 3/3042 330/284 |
| 2016/0095002 A1 * | 3/2016 | Zhan | .................. | H04B 7/15557 370/294 |
| 2016/0269132 A1 * | 9/2016 | Clark | .................... | H04W 16/28 |
| 2016/0301371 A1 * | 10/2016 | Ashworth | ............... | H03F 3/211 |

OTHER PUBLICATIONS

Wideband Consumer Signal Booster Compliance Measurement Guidance, Federal Communications Commission Office of Engineering and Technology Laboratory Division, Feb. 12, 2016, 36 pgs.

* cited by examiner

——— signal level
· — · · — · · oscillation and signal level

METHOD FOR DETECTING AND HANDLING OSCILLATIONS IN A SIGNAL BOOSTER DEVICE, A SIGNAL BOOSTER DEVICE AND A MEANS OF TRANSPORTATION COMPRISING A SIGNAL BOOSTER DEVICE

STATEMENT REGARDING FEDERALLY SPONSORED RESEARCH OR DEVELOPMENT

None.

FIELD

The technology herein relates to a booster amplifier for mobile communication and especially to a method for detection oscillations within such a booster amplifier.

BACKGROUND

A booster amplifier is used to amplify wireless communication signals. More particular, a signal booster is a device that automatically receives, amplifies, and retransmits on a bidirectional or unidirectional basis, the signals received from base, fixed, mobile, or portable stations, with no change in frequency or authorized bandwidth.

Such signals boosters are used in transport vehicles like cars, trains and so on. However, the use of signal boosters is not limited to transport vehicles. It can also be used within buildings for example. Signal boosters comprise a first antenna and a second antenna, wherein the first antenna is arranged within the transport vehicle and wherein the second antenna is arranged at the outside of the transport vehicle. The first antenna is used for sending and receiving communication signals form a mobile, wherein the second antenna is used for sending and receiving communication signals from a base station. Thus, the mobile is connected to the base station though the signal booster. It is very advantageous that the transmit power of the mobile is far below from its maximum transmit power, wherein it is ensured at the same time that a stable connection is established between the mobile and the base station. This connection is independent of any influence from an electromagnetic shielding the transport vehicle may comprise.

In general, a repeater is also some kind of signal booster. However, a repeater is able to amplify a signal with a much higher gain than a signal booster.

Unfortunately, it is possible that the use of a signal booster disrupts cellular systems. This disruption may not be limited to the network the signal booster uses, but could also be spread to other neighboring networks. A power overload situation may occur. In a result, other devices may be disconnected. A signal booster may also increase the noise floor, which decreases the sensitivity of the base station and therefore reduces the covered area for all devices. These effects are often a result when the signal booster begins to self-oscillate. Furthermore, this could also result in a poor reception by the base station inhibiting a mobile to establish a communication at all.

To prevent these malfunctions, any occurring oscillations within a signal booster have to be detected and as a result the amplification has to be reduced or disabled at all. In order to obtain an approval for operating a booster device, the FCC (Federal Communication Commission) has issued guidelines that any booster device has to comply with. Reference is made to FCC Title 47, Chapter I, Subchapter B, Part 20, § 20,21 (Signal boosters) dated Feb. 11, 2015 which is herein incorporated by reference.

The aforementioned problem has also been partly addressed by the international patent application WO 2013/028921 A1. This application describes a method for detecting self-oscillations within a signal booster. The method is based on a power measurement of the communication signal. The communication signal is attenuated by a certain factor larger than zero. This factor may also be applied when the signal booster amplifies signals from the base station or from the mobile and transmits them to the mobile or the base station. A normal operation gain of the signal booster would be achieved. Then a first signal power is measured. If any oscillations occur, these oscillations are contained within the measurement result. Afterwards, the attenuation is increased so that the signal level is reduced and another signal power is measured this time. By increasing the attenuation, the oscillations are reduced much more than the (useful) signal itself. By determining a difference between the measured signal powers, it can be assessed whether the booster amplifier oscillates or not.

The FCC demands that an oscillation has to be detected at latest if the oscillation reaches a level of 12 dB above the noise floor.

The power of an oscillation depends on the isolation between the input port and the output port of the signal booster device (e.g. antenna ports). If the isolation is higher, the power of the oscillation is lower and vice versa.

The signal booster disclosed in the WO 2013/028921 A1 is only able to detect oscillations if the isolation between the input port and the output port is below a respective isolation level.

Therefore, the problem addressed herein is that of describing and/or creating a method and a signal booster device fulfilling the FCC requirements with respect to signal boosters in a reliable and repeatable manner. The signal booster device according to the present allows detecting oscillations at an isolation level that is higher than the one of the signal booster disclosed in the WO 2013/028921 A1. The occurrence of oscillations can therefore be detected sooner.

SUMMARY OF THE INVENTION

This problem is accomplished with respect to a method for detecting and handling oscillations in a signal booster device and the respective signal booster device itself. Furthermore a means of transportation is shown comprising such a signal booster device. Advantageous non-limiting implementations of the method for detecting and handling oscillations in a signal booster device or of the signal booster device itself are provided in the depending claims.

The method for detecting and handling oscillations in a signal booster device in a wireless communication network requires that the signal booster device comprises at least one first antenna for communicating with a mobile and at least one second antenna for communicating with a base station and at least one amplifier. The signal booster device is configured to adjust a gain between the at least two antennas by altering the amplification factor, wherein a normal operation gain is achieved by setting the amplification factor to a first amplification factor. This first amplification factor is set before the method for detecting oscillations is executed. Within the method, the following steps are performed:

determining at least one first signal power of the attenuated signal;

increasing the operation gain of the signal booster device by setting the amplification factor to a second amplification factor, wherein the second amplification factor is higher than the first amplification factor;

determining at least one second signal power of the signal;

correlating the at least one first signal power with the at least one second signal power;

determining whether a status of the signal booster device is oscillation or normal based upon the result of the correlation.

The "normal operation gain" is determined considering several criteria. Those criteria meet at least the industry standards, such as avoidance of base station overload, base station noise floor protection or the limitation of output power. For example, the signal booster device is in "normal operation gain" mode when the method for detecting oscillations is not performed. Signal boosters may amplify a signal up to 23 dB. In order to maintain any reserves the signal booster will normally not amplify a signal with 23 dB. Thus, the normal operation gain will be less than 23 dB.

It is very beneficial that the operation gain is increased above the normal operation gain when measuring the at least one second signal power. If there are any oscillations present, they will be amplified and will therefore be detected easier compared to the state of the art where the operation gain is reduced below the normal operation gain.

A correlation comprises any mathematical operation applied between the first signal power and the second signal power. Preferably, the correlation comprises arithmetic operations. In another aspect of the present invention, the correlation comprises a calculation of a power ratio based on the at least one first signal power and the at least one second signal power or a calculation of a difference between the signal powers. The status of the signal booster device is oscillation when the power ratio or the difference exceeds a threshold or is less than a threshold and wherein the status is normal when the power ratio or the difference is less than the threshold or exceeds a threshold.

According to another aspect of the present invention a weighting function can be used for weighting the calculated difference. This weighting function can be accomplished by a counter for example. Every time the calculated difference exceeds a threshold a counter is increased or decreased. Whenever the calculated difference is within a threshold the counter is decreased or increased. When the counter reaches a certain value the status of the signal booster device is set to oscillation.

If the status is oscillation it is very beneficial that the method of the present invention not only reduces the gain or powers down the amplifiers at all, but also enables a bypass-line between the at least one first antenna and the at least one second antenna. The bypass line electrically connects the at least one first antenna directly to the at least one second antenna. Even if no amplification of the communication signal (downlink and/or uplink) is possible any more, the mobile is still able to connect to the base station although this is mostly done at lower data rates.

The signal booster device according to the present invention which is able to carry out the method described above comprises at least one first antenna for communicating with a mobile and at least one second antenna for communicating with a base station. The signal booster device also comprises a first duplexer and a second duplexer, wherein each of them has at least two signal-line-ports. A downlink signal path and an uplink signal path are split up into two separated electrical lines by the first and second duplexer, wherein the electrical lines run between the first signal-line-ports and the second signal-line-ports of the first and the second duplexer, whereby the at least one first antenna is connected to a third connecting port of the first duplexer and wherein the at least one second antenna is connected to a third connecting port of the second duplexer. At least one first amplifier is arranged within the downlink signal path and at least one second amplifier is arranged within the uplink signal path. The signal booster device also comprises at least one power detector for detecting the signal power in the downlink and/or uplink path. Furthermore, the signal booster device also comprises a control unit configured to change the operation gain of the signal booster device.

Last but not least, a means for transportation according to the present invention is also described herein. The means of transportation comprises a signal booster device as described above, wherein the at least one first antenna is arranged within the means of transportation and wherein the at least one second antenna is arranged on the outside of the means of transportation. The means for transportation could be but is not limited to a vehicle, a ship, a train or a plane.

Various non-limiting embodiments are described in detail below as examples with reference to the drawings. Objects which are the same have the same reference numbers.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

Figure 1A:
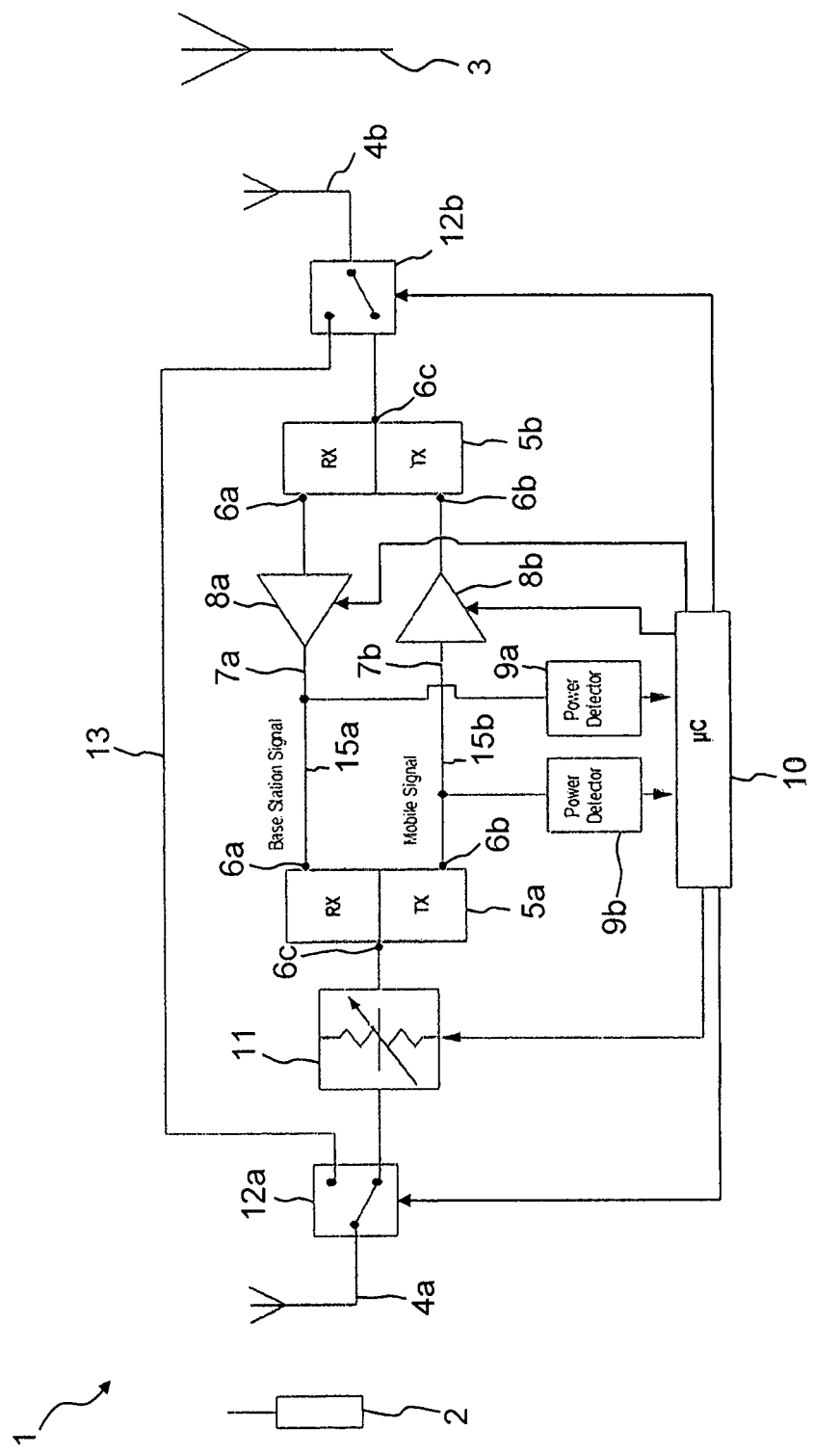
FIG. 1A-1C: shows a block diagram of an embodiment of a signal booster device according to one embodiment of the present invention.

FIG. 1 shows a block diagram of an embodiment of a signal booster device 1 according to the present invention. The signal booster device 1 is used to connect one or more mobiles 2 to a base station 3. The signal booster device 1 is configured to receive a communication signal from the base station 3 and/or from the mobile 2 and to retransmit this communication signal to the mobile 2 and/or to the base station 3. The signal booster device 1 is also able to amplify the respective communication signal.

During normal operation, the gain of the signal booster device 1 is preferably constant over a respective time period, i.e. several second or minutes. The gain is also called "normal operation gain" during that case. The signal strength of the uplink signal received by the base station 3 is thereby controlled by the mobile 2 since the amplification through the signal booster device 1 is more or less constant.

In another embodiment of the present invention the signal booster device 1 is used within a means of transportation like a vehicle, a train, a ship or a plane.

The signal booster device 1 comprises at least one first antenna 4a and at least one second antenna 4b. The at least one first antenna 4a is used for establishing a communication link between the signal booster device 1 and the mobile 2. The at least one second antenna 4b is used for establishing another communication link between the signal booster device 1 and the base station 3. The at least one first antenna 4a is preferably arranged within the means of transportation. This means that the at least one first antenna 4a is arranged within the vehicle, the train, the ship or the plane and is able to cover the inside area of the means of transportation.

On the contrary thereto, the at least one second antenna 4b is arranged outside of the means of transportation. For example the at least one second antenna 4b may be mounted on the roof of the vehicle, the train, the ship or the plane but not limited thereto. Having the signal booster device 1 installed in such a way the mobile 2 inside the means of transportation may easily connect to the base station 3. In this case the mobile 2 does not amplify its signals even close to a maximum. The at least one first antenna 4a and the mobile 2 are closely arranged together. Preferably, the at least one first antenna 4a is mounted in a center console or a dashboard of the vehicle. More preferably, the at least one first antenna is mounted in a cradle within the means of transportation which is used to hold the mobile 2. Thus, the attenuation between the mobile 2 and the at least one first antenna 4a depends on the arrangement between the mobile 2 and the at least one first antenna 4a. A galvanic connection between the mobile 2 and the at least one first antenna 4a could also be possible. This could be achieved by a coaxial cable for example.

On the other hand the at least one second antenna 4b may be arranged in an elevated position on the means of transportation. So it is assured that the communication link between the at least one second antenna 4b and the base station 3 is secured. Even if the means of transportation comprises an outer wall which is impermeable to electromagnetic radiation the mobile can still communicate with the respective base station 3. Even if the signal transmitted through the at least one second antenna 4b is highly amplified, a user within the means of transportation will not be influenced by the high powered radio frequency field.

It would also be possible to use a plurality of first antennas 4a and/or second antennas 4b. In this case the signal booster device 1 could support MIMO (multiple input multiple output) operation.

The signal booster device 1 also comprises a first duplexer 5a and a second duplexer 5b. A duplexer 5a, 5b is a device which is configured to split up a signal into at least two signal paths, wherein the signal travelling through each signal path comprises a different frequency span. The duplexer 5a, 5b may also be called a diplexer.

Each of the two duplexers 5a, 5b has at least two signal-line-ports 6a, 6b and one connecting port 6c which is used to connect the duplexers 5a, 5b to the respective at least one first or second antenna 4a, 4b.

A first electrical line 7a running between the first duplexer 5a and the second duplexer 5b is used to connect the first signal-line-port 6a of the first duplexer 5a to the first signal-line-port 6a of the second duplexer 5b. Furthermore, the signal booster device 1 also comprises a second electrical line 7b running between the first duplexer 5a and the second duplexer 5b. The second electrical line 7b is also used to electrically connect the second signal-line-port 6b of the first duplexer 5a to the second signal-line-port 6b of the second duplexer 5b.

With respect to FIG. 1 of the present invention, the first electrical line 7a is used to carry or transport a signal which is transmitted by the base station 3 and received by the at least one second antenna 4b. This signal is then fed to the second duplexer 5b. Within the second duplexer 5b the signal having a specific frequency span is then split up from other signals and output through the first signal-line-port 6a of the second duplexer 5b. When speaking of a signal transmitted from the base station 3 a downlink-signal 15a is meant. The signal is then fed into the first signal-line-port 6a of the first duplexer 5a. The downlink-signal 15a is transmitted to the at least one first antenna 4a. The at least one first antenna 4a broadcasts the downlink-signal 15a and the at least one mobile 2 is able to receive it.

On the contrary, when the at least one mobile 2 decides to transmit a signal to the base station 3, the signal is received by the at least one first antenna 4a and is then fed to the first duplexer 5a. The first duplexer 5a outputs this signal through the second signal-line-port 6b. This signal is called uplink-signal 15b. Because it has a different frequency span compared to the downlink-signal 15a the first duplexer 5a outputs it at the second signal-line-port 6b. The signal is then fed through the second electrical line 7b to the second signal-line-port 6b of the second duplexer 5b. The second duplexer 5b transmits this signal to the at least one second antenna 4b which broadcasts the signal so that the base station 3 is able to receive it.

To do so the at least one first antenna 4a is connected directly or indirectly to the third connecting port 6c of the first duplexer 5a, wherein the at least one second antenna 4b is connected directly or indirectly to the third connecting port 6c of the second duplexer 5b. The embodiment of the present invention according to FIG. 1 shows an indirect connection. Other elements like an attenuator 11 and/or a first and second switching device 12a, 12b which are described below are arranged in between.

It is also possible that the first and the second duplexer 5a, 5b comprise more than two signal-line-ports 6a, 6b. It would be possible that the first and the second duplexer 5a, 5b comprise three, four, six, eight or more signal-line-ports 6a, 6b. In this case, there would be more than one downlink path and more than one uplink path available for the received or transmitted signal. Depending on the frequency span of the signal 15a, 15b the respective uplink or downlink path is chosen.

The first and/or the second duplexer 5a, 5b could comprise a cavity filter structure.

The signal booster device 1 also comprises at least one first amplifier 8a and at least one second amplifier 8b. The at least one first amplifier 8a is arranged within the downlink signal path and the at least one second amplifier 8b is arranged within the uplink signal path.

This means that the at least one first amplifier 8a is arranged between the first signal-line-ports 6a of the first and the second duplexers 5a, 5b and that the at least one second amplifier 8b is arranged between the second signal-line ports 6b of the first and the second duplexer 5a, 5b.

This means that preferably at least one amplifier 8a, 8b is arranged within every electrical line 7a, 7b connecting the respective signal-line-ports 6a, 6b of the first and the second duplexer 5a, 5b.

The at least one first amplifier 8a and the at least one second amplifier 8b can comprise more than one amplifier or amplifier stage. For example, it is possible that the at least one first amplifier 8a and the at least one second amplifier 8b comprise a pre-amplifier and a main amplifier.

The at least one first amplifier 8a is configured to amplify the downlink-signal 15a which is output by the first signal-line-port 6a of the second duplexer 5b. In contrary thereto, the at least one second amplifier 8b is used to amplify the uplink-signal 15b which is output at the second signal-line-port 6b of the first duplexer 5a.

The signal booster device 1 also comprises at least one power detector 9a, 9b for detecting the signal power of the downlink-signal 15a and/or the uplink-signal 15b in the downlink and/or uplink path 7a, 7b. With respect to FIG. 1 of the present invention, a first power detector 9a is used to detect a signal power of a signal running though the first electrical line 7a. A second power detector 9b is used to detect a signal power of signal running through the second electric line 7b. The first power detector 9a is preferably connected to the first electrical line 7a after the downlink-signal 15a has been amplified by the first amplifier 8a. However, the first power detector 9a could also have been connected to the first electrical line 7a at a position before the downlink-signal 15a gets amplified.

In contrary thereto, the second power detector 9b is connected to the second electrical line 7b (uplink-path). The second power detector 9b is preferably connected to the second electrical line 7b before the up-link-signal 15b gets amplified by the second amplifier 8b. It could also be possible that the second power detector 9b is connected to the second electrical line 7b after the uplink-signal 15b has been amplified by the second amplifier 8b.

If the number of electrical lines 7a, 7b is higher than two, i.e. if each duplexer 5a, 5b has more than two signal-line-ports 6a, 6b, then the number of power detectors 9a, 9b could also be increased. The signal booster device 1 preferably comprises one power detector for each signal-line-port 6a, 6b (downlink-path and uplink-path).

In general, it would also be possible to arrange the power detectors 9a, 9b before and/or after the respective amplifiers 8a, 8b.

Furthermore, it is also be possible to arrange at least one power detector 9a, 9b between the at least one first antenna 4a and the third connecting port 6c of the first duplexer 5a. Thus, it is also possible to arrange at least one power detector 9a, 9b between the at least one second antenna 4b and the third connecting port 6c of the second duplexer 5b.

Every power detector 9a, 9b contains and/or is connected to an analog-digital-converter (not shown). The A/D-converter converts an analog voltage into a digital value. The analog voltage corresponds to the signal power of the downlink-signal 15a or the uplink-signal 15b.

The signal booster device 1 also comprises a control unit 10. The control unit 10 is able to read out the signal power of the uplink- and/or downlink-signal 15b, 15a from the first and/or second power detector 9a, 9b. The A/D-converter could be an integral part of the at least one power detector 9a, 9b. It could also be possible that the A/D-converter is a separate unit. The A/D-converter could also be integrated into the control unit 10.

The control unit 10 is for example a microcontroller. However, the control unit 10 is not limited to a microcontroller but could also be a FPGA (field programmable gate array) or any other programmable (logic) device.

The signal booster device 1 also comprises at least one attenuator 11. With respect to FIG. 1 the at least one attenuator 11 is generally arranged between the at least one first antenna 4a and the at least one second antenna 4b.

Figure 1B:
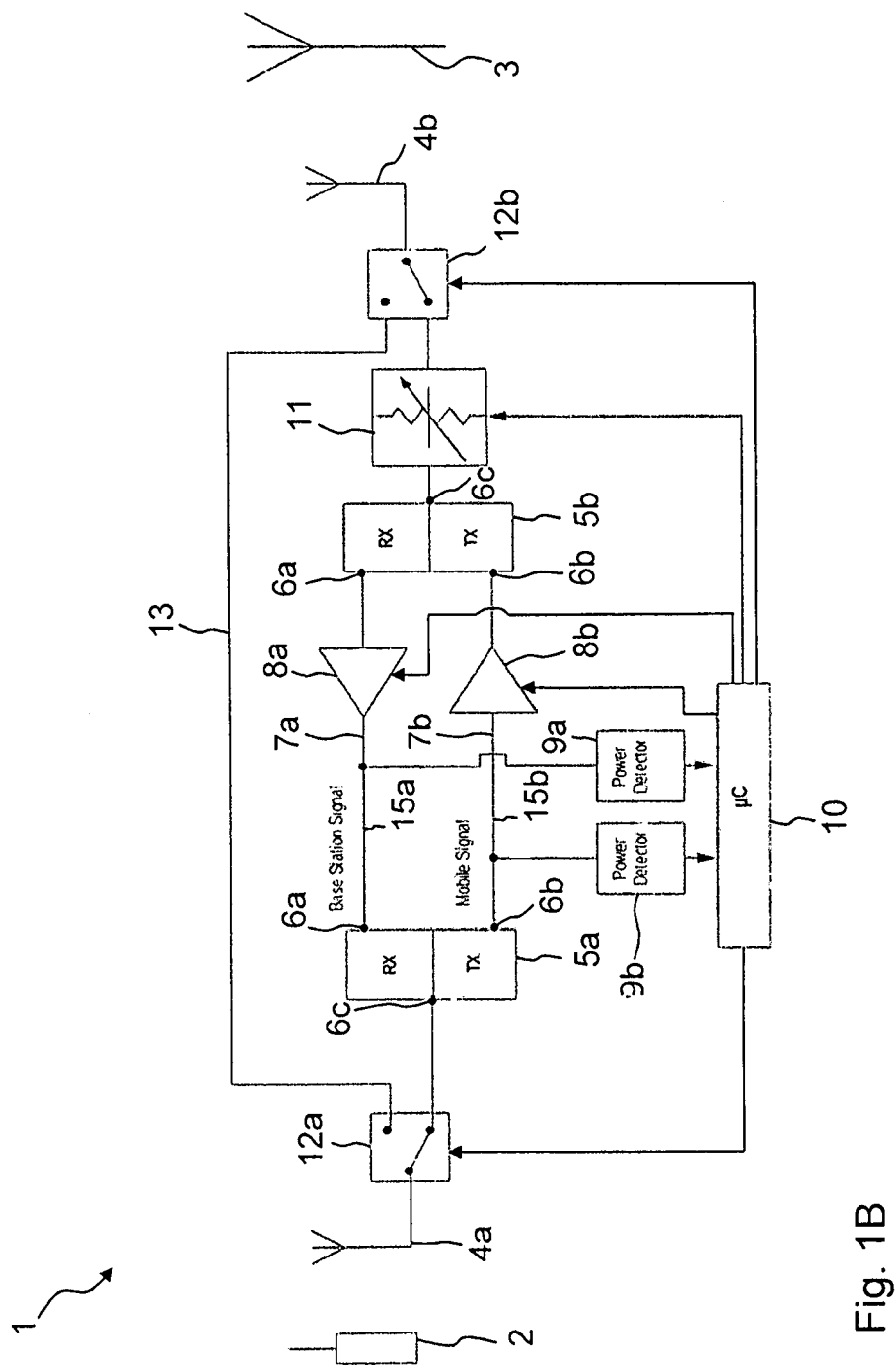
Figure 1C:
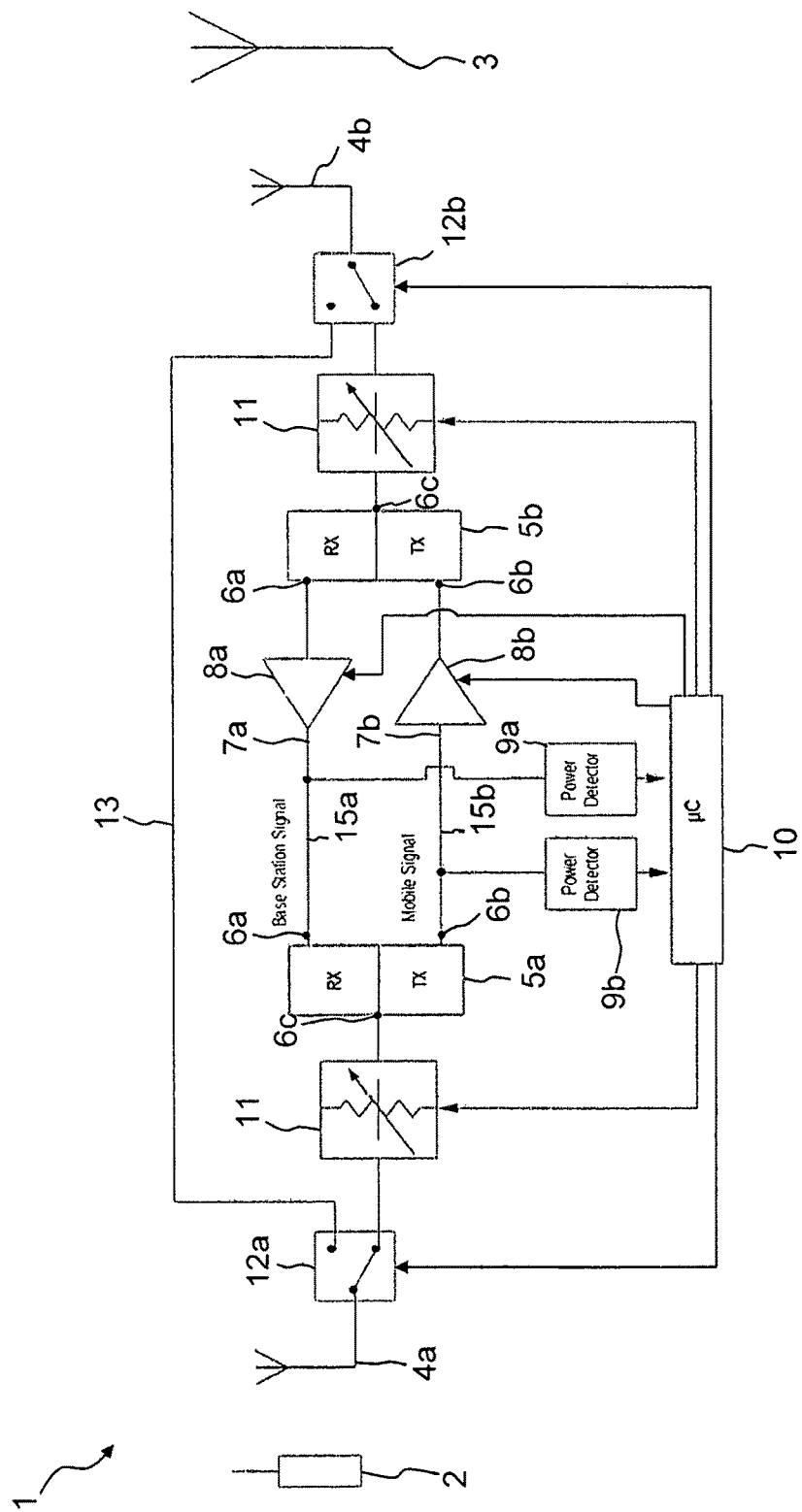

Within an embodiment of the present invention shown in FIG. 1, the at least one attenuator 11 is arranged between the at least one first antenna 4a and the first duplexer 5a. This is shown in FIG. 1B. Within FIG.1C it is shown that two attenuators 11 are used. A first attenuator 11 is arranged between the first antenna 4a and the first duplexer 5a and a second attenuator 11 is arranged between the second duplexer 5b and the second antenna 4b. It could also be possible to arrange the at least one attenuator 11 between the at least one second antenna 4b and the second duplexer 5b. It could also be possible to arrange the at least one attenuator within the downlink-signal path 7a and/or within the uplink-signal path 7b. In this case at least one attenuator 11 would be needed for every signal path 7a, 7b.

The control unit 10 is configured to control the at least one attenuator 11 as well as the at least one first amplifier 8a and the at least one second amplifier 8b. Furthermore, the control unit is also configured to readout the respective measurement values for the signal power of the downlink-signal 15a and/or uplink-signal 15b from the first and the second power detector 9a, 9b.

Within another embodiment of the present invention the signal booster device 1 also comprises a first switching device 12a and a second switching device 12b. The first switching device 12a is preferably arranged between the at least one first antenna 4a and the at least one attenuator 11. The second switching device 12b is preferably arranged between the at least one second antenna 4b and the second duplexer 5b.

Both switching devices 12a, 12b have a first, a second and a third connection port. The first connection port of the first switching device 12a is connected to the at least one first antenna 4a, wherein the first connection port of the second switching device 12b is connected to the at least one second antenna 4b.

The second connection port of the switching device 12a is connected to the at least one attenuator 11. The first connection port of the second switching device 12b is connected to the third input port 6c of the second duplexer 5b. The third connection ports of the first and the second switching devices 12a, 12b are connected together forming a bypass-line 13.

The control unit 10 is also configured to control the first and the second switching devices 12a, 12b.

When the signal booster device 1 is in normal operation the first switching device 12a electrically connects the at least one first antenna 4a to the at least one attenuator 11. The second switching device 12b connects the at least one second antenna 4b to the third connecting port 6c of the second duplexer 5b. In this mode of the signal booster device 1, the uplink and downlink signals 15b, 15a will be amplified.

When an oscillation 20 has been detected within the sig-nal booster device 1 as described below, the control unit 10 may try reducing the gain of both amplifiers 8a, 8b or of at least the transmit amplifier 8b. If the signal booster device 1 still oscillates, the control unit 10 will power down the amplifiers 8a, 8b and will alternate the switching position of the first and the second switching devices 12a, 12b. In this the at least one first antenna 4a is directly connected to the at least one second antenna 4b by the bypass line 13. The quality of the received signal and of the transmitted signal will be lower at the mobile 2 or the base station 3 compared to fully functional signal booster device 1. But the mobile 2 should still be able to communicate with the base station 3. Although the data rate might drop down a little bit.

If the attenuator 11 is arranged between the at least one second antenna 4b and the second duplexer 5b, the first switching device 12a connects the at least one first antenna 4a to the first duplexer 5a. The second switching device 12b then connects the at least one second antenna 4b to the at least one attenuator 11. A different arrangement of the attenuator 11 or of the first and second power detector 9a, 9b does not influence the existence of the bypass-line 13. It is always possible for the control unit 10 to directly electrically connect the at least one first antenna 4a to the at least one second antenna 4b by outputting a respective control signal to the first and second switching devices 12a, 12b.

The control unit 10 is also configured to set an amplification factor. The desired amplification factor of the signal booster device 1 could be achieved by a respective setting of the attenuator 11 and/or of the first and/or second amplifier 8a, 8b.

As explained below, the control unit 10 is also configured to continuously determine the status of the signal booster device 1. The wording "continuously" is understood in such a way that an oscillation 20 of the signal booster device 1 is detected in less than one second for example, preferably in less than 500 ms, further preferably in less than 400 ms or 300 ms or 200 ms or 100 ms.

Figure 2A:
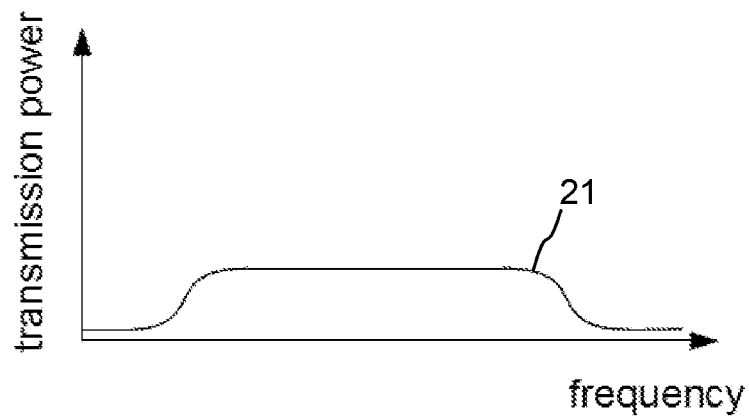
FIGS. 2A-2C: show various illustrations which describe the appearance of oscillations within the measured signal power of a signal.
Figure 2B:
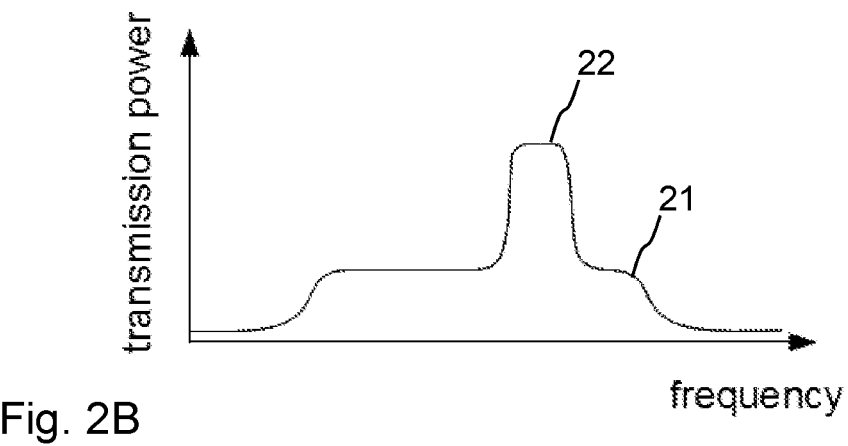
Figure 2C:
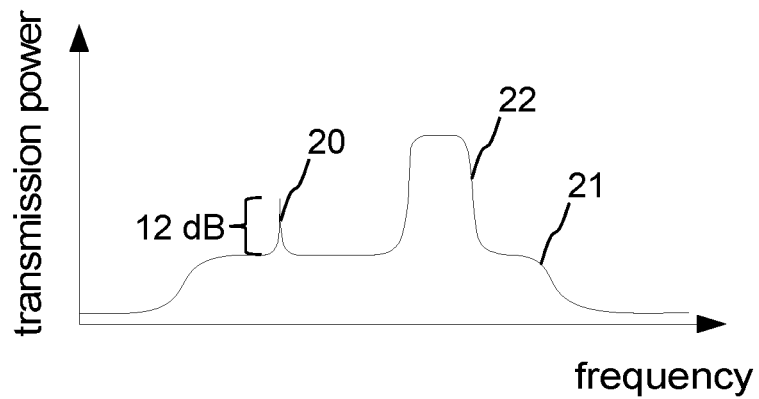

With respect to the FIGS. 2A to 2C it is described in more detail what an oscillation 20 which has to be detected looks like. FIG. 2A shows an illustration of a measurement result when a spectrum analyzer (for example) is used for detecting any signal in the uplink or downlink path 7b, 7a when no signal is transmitted or received. The spectrum analyzer would only display the noise floor 21 as shown in FIG. 2A.

Within FIG. 2B a signal 22 is transmitted or received through the uplink or downlink path 7b, 7a. The signal level is above the level of the noise floor 21. Within FIG. 2B no oscillations 20 are present. This would be the desired (normal) mode of operation of the signal booster device 1. Preferably the amplification factor of the signal booster device 1 is constant during normal operation when no oscillations 20 are to be detected. In this case, the signal booster device 1 is working with the normal operation gain.

In FIG. 2C an oscillation 20 is shown besides the signal 22. The power level of the oscillation 20 is above the noise level 21. The FCC demands that the oscillation 20 has to be detected at latest if the oscillation 20 reaches a level of 12 dB above the noise floor 21. A signal booster device 1 may not be used if it detects the oscillation 20 only at higher power levels (>12 dB).

In the following a method will be introduced for detecting and handling oscillations 20 in the signal booster device 1. The method will be capable of detecting an oscillation 20 well before its power level reaches the value of 12 dB above the noise level 21.

Figure 3A:
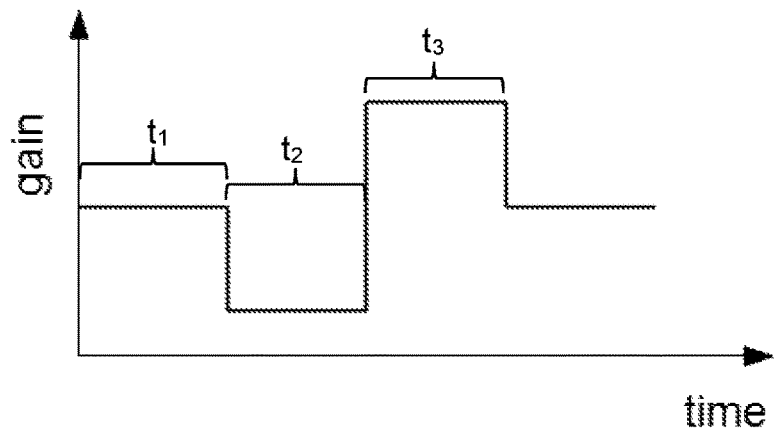
FIGS. 3A and 3B: show the operation gain of the signal booster device achieved by adjustment of various amplification factors according to the present invention.
Figure 3B:
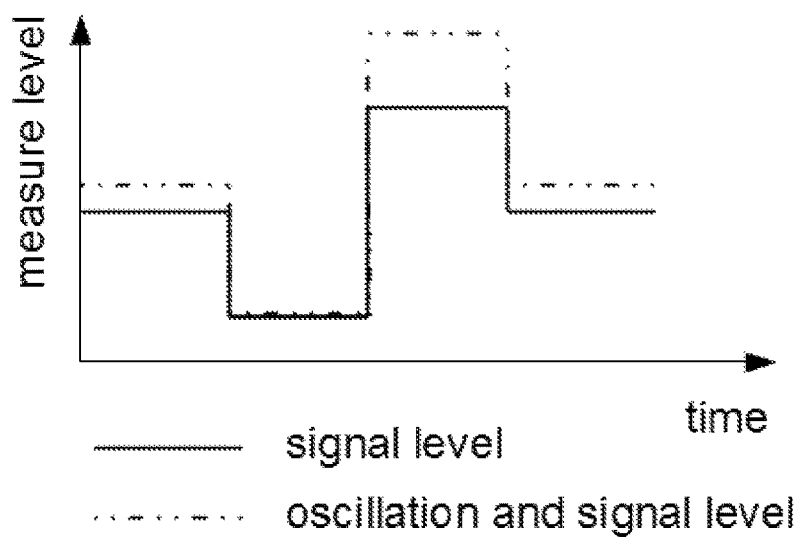

The FIGS. 3A and 3B show the adjustment of various amplification factors within the signal booster device and the corresponding signal levels.

Within FIG. 3A a change in the operation gain over the time is shown. Such an adjustment of the operation gain is preferably achieved by an adjustment of the attenuator 11 and/or of the at least one first and/or second amplifier 8a, 8b. The adjustment of the various amplification factors of the signal booster device 1 is done by the control unit 10. Within a first time period $t_1$ the amplification factor is set to a first amplification factor. The first amplification factor is chosen in such a way that it is below a maximal amplification factor of the signal booster device 1. This assures that the signal booster device 1 still maintains a reserve. Preferably, the first amplification factor is at least 0.5 dB or 1 dB or 1.5 dB or 2 dB or 2.5 dB or 3 dB or 3.5 dB or 4 dB or 4.5 dB or 5 dB below the maximal amplification factor. The maximal amplification factor is preferably about 23 dB. When the signal booster device 1 operates with the first amplification factor a normal operation gain is achieved. This mode of operation is chosen for most of the time when no oscillations 20 are to be detected. Variations could occur when the signal booster device 1 is too far away from the base station 3 or too close to the base station 3 and/or when the coupling between the mobile 2 and the at least one first antenna 4a is beyond any predetermined limits.

It is possible to measure at least one first signal power within the first time interval $t_1$. This could be done by using the first and/or the second power detector 9a, 9b.

The operation gain of the signal booster device 1 shown within the second time period $t_2$ may be set optional and will be explained later.

However, it is mandatory that the operation gain of the signal booster device 1 is also set above the normal operation gain. This is done within the third time period $t_3$. A second amplification factor is chosen, wherein the second amplification factor is higher than the first amplification factor which is set in the first time period $t_1$. The second amplification factor could be set in such a way that the signal booster device 1 could amplify a signal with up to 23 dB for example. In other words, it is possible that any attenuators 11 are disabled is this case.

In this case at least one second signal power is measured within the third time interval $t_3$. This could be done by using the first and/or the second power detector 9a, 9b.

The difference between the operation gain when the first amplification factor is set and when the second amplification factor is set is preferably larger than 0.5 dB or 1 dB or 2 dB or 3 dB or 4 dB or 6 dB.

The use of the second amplification factor that is higher than the first amplification factor allows that the oscillations 20 are detected easier. This circumstance is shown in FIG. 3B. A superposition is shown comprising the signal 22 as well as the oscillation 20. A difference between the measured signal level (dotted line) and the expected signal level (drawn through line) is larger in the third time period $t_3$ than in the first time period $t_1$.

This means that if oscillations 20 occur within the sig-nal booster device 1 a superposition of the signal 21 and the oscillation 20 will be over proportional if the amplification factor is increased compared to the one set for the normal operation gain (time period $t_3$). In order to detect an oscillation 20 in a reliable manner the difference between the individual amplification factors has to be significant for example.

In order to increase the likelihood for detecting any oscillations 20 the operation gain is reduced in a second time interval $t_2$ below the normal operation gain. The second time interval $t_2$ is arranged between the first and the third time intervals $t_2$, $t_3$. Within the second time interval $t_2$ another amplification factor is set which is lower than the first and the second amplification factors. For example, the gain of the at least one first and/or second amplifier 8a, 8b is reduced and/or the attenuation of the attenuator 11 is increased compared to the respective settings in the first time interval $t_1$. After that the at least one first signal power is measured.

The difference between the operation gain of the signal booster device 1 in the first time interval $t_1$ and the second time $t_2$ interval is preferably larger than the difference between the operation gain of the signal booster device 1 in the first time interval $t_1$ and the third time interval $t_3$.

Within the second time interval $t_2$ the amplification of the signal booster device 1 could be disabled at all. This could be done by reducing the gain of the at least one first and/or second amplifier 8a, 8b to a minimum or by increasing the attenuation of the attenuator 11 to a maximum.

It is also possible to select the operation gain within the second time interval $t_2$ depending on the signal strength in the first time interval $t_1$. The operation gain is reduced the more the higher the signal strength is.

In order to determine whether the signal booster device 1 oscillates both measured signal powers are correlated with each other. Such a correlation preferably comprises the calculation of a difference or a ratio between the measured signal powers in the different time periods $t_1$ or $t_2$ and $t_3$. When the difference exceeds a predetermined threshold or is less than a predetermined threshold this would be an indication than an oscillation 20 appears in the signal booster device 1.

In the following FIGS. 4 and 5 various embodiments of the present invention are described.

In general, a signal being transmitted from the at least one first antenna 4a to the at least one second antenna 4b or vice versa is amplified with the first amplification factor. Then at least one first signal power is determined of the signal. As stated above, this can be done by using the first and/or the second power detector 9a, 9b in combination with at least one A/D-converter. The at least one signal power is obtained by a various amount of samples that can be read out from the A/D-converter by using the control unit 10. Preferably more than one sample is obtained from the A/D-converter. The amount of samples can be as high as at least 5 or at least 10 or at least 20 or at least 40 or at least 50 or at least 70 or at least 100 samples. The samples are obtained in a short time. The samples are preferably obtained in less than 20 ms or less than 10 ms. If a GSM signal is measured, the samples are obtained within a fraction of the time interval a GSM burst lasts.

After the at least one first signal power has been determined the operation gain of the signal booster device 1 is increased above a normal operation gain. This could be done by increasing the amplification of the at least one first and second amplifiers 8a, 8b or by reducing or disabling the attenuator 11. In other words a second amplification factor is applied to the signal booster device 1 which is larger than the first amplification factor. After that the at least one second signal power of the signal is determined. Afterwards, the control unit 10 correlates both measured signal powers. This is preferably done by calculating a power ratio based on the at least one first signal power and at least one second signal power or simply by calculating the difference between the at least two obtained signal powers. When calculating the difference between the first signal power and the second signal power it is possible that the second signal power is subtracted from the first signal power or that the first signal power is subtracted from the second signal power. Preferably the magnitude of the difference is calculated. The same is also true when a power ratio is calculated. It is possible that the first signal power is divided by the second signal power or that the second signal power is divided by the first signal power.

In the following the status of the signal booster device 1 is determined. Preferably, the status is oscillating, when the calculated power ratio or the calculated difference exceeds a threshold. The status is normal when the calculated power ratio or the calculated difference is less than the threshold. The status could also be oscillating, when the calculated power ratio or the calculated difference is less than a threshold. The status could then be normal when the calculated power ratio or the calculated difference exceeds a threshold.

It is beneficial that the amplification factor is increased (like the operation gain) and not decreased like taught in the state of the art. As explained above, increasing the amplification factor comes along with an increased likelihood of detecting any oscillations 20. The oscillations 20 will be detected even if an isolation between the at least one first antenna 4a and the at least one second antenna 4b or between the respective input ports of the signal booster device 1 to which the antennas 4a, 4b are connected is high. The oscillations 20 are therefore detected earlier compared to the system disclosed in the state of the art.

Figure 4:
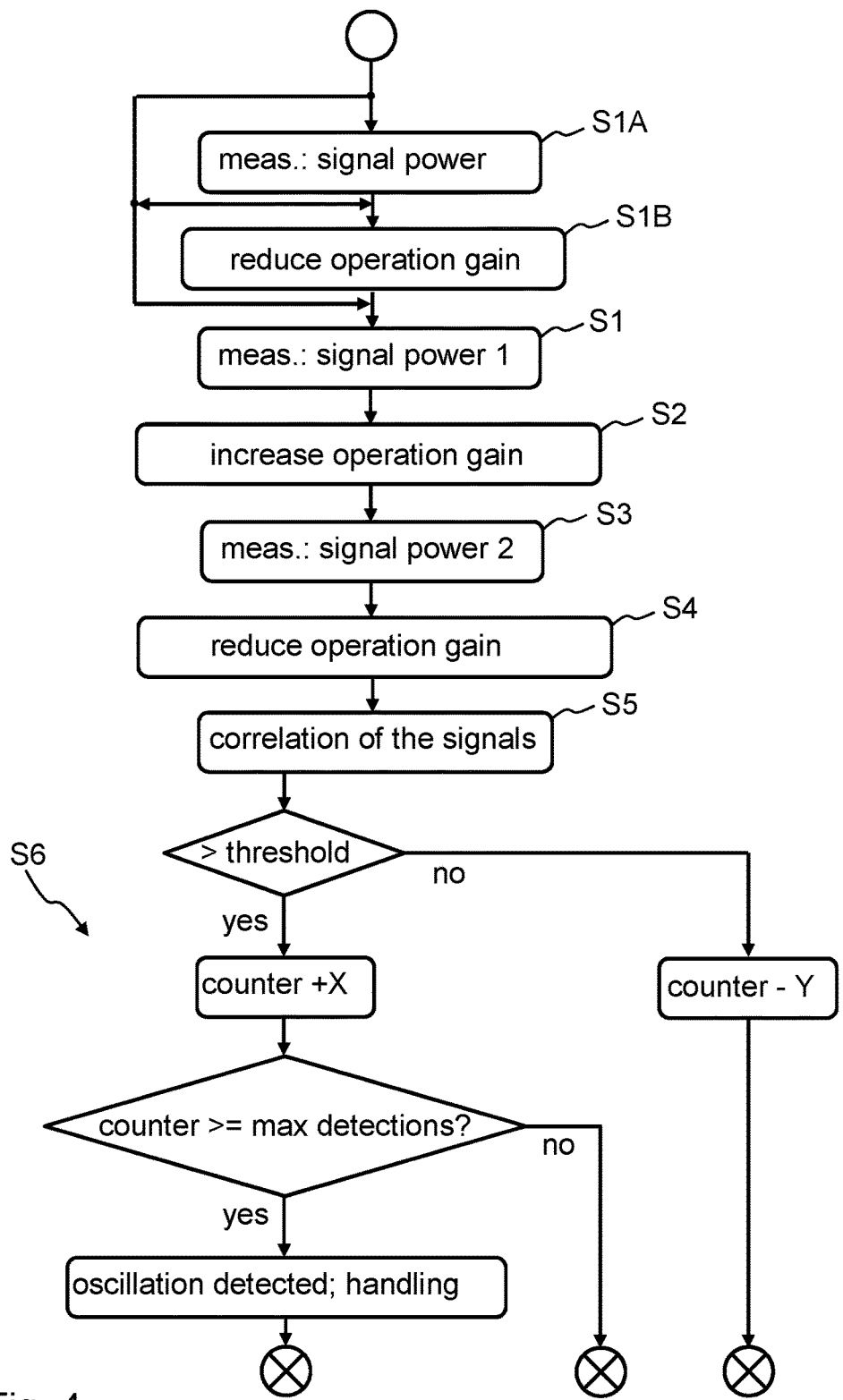
FIG. 4: shows a flow chart which explains how the method for detecting and handling oscillations according to the present invention is carried out.

FIG. 4 shows a flow chart which explains how the method for detecting and handling oscillation 20 works.

In a first step S1 at least one first signal power is determined. This step is preferably executed within the time interval $t_1$ as shown in FIG. 3A. The operation gain of the signal booster device 1 is set to a normal operation gain by setting the amplification factor to a first amplification factor. After the first signal power has been determined the operation gain is increased by setting the amplification factor of the signal booster device 1 to a second amplification factor. The second amplification factor is higher than the first amplification factor. This is all done within the step S2. Afterwards the step S3 is performed. Within step S3 the at least one second signal power of the signal is determined. Afterwards the operation gain can be set back to the normal operation gain as shown in step S4. However, step S4 does not have to follow step S3. It only has to be executed before step S1 is executed again. Afterwards step S5 is executed. Within step S5 the control unit 10 correlates the determined signal powers. This is preferably done by calculating the power ratio based on the at least one first signal power and the at least one second signal power. As mentioned before, the at least one first signal power could be an average value of a plurality of samples. The same is also true for the second signal power. Within this step it is also possible to calculate the difference between the two signal powers.

Afterwards the step S6 is executed. Within the step S6 it is determined whether the status of the signal booster device 1 is oscillating or normal. With respect to FIG. 4 the status is oscillating when the power ratio or the difference between the two signal powers exceeds a threshold. If the power ratio or the difference between the two signal powers is less than a threshold than the status is normal and the signal booster device 1 does not oscillate. As mentioned above the assessment whether the status is oscillating or normal could also be reversed.

When the control unit 10 discovers that the status of the signal booster device 1 is oscillating the control unit 10 is preferably configured to reduce the gain of all amplifiers or of at least the transmit amplifier 8a, 8b. Furthermore it would also be possible to disable all or at least the transmit amplifier 8a, 8b.

However, to prevent that the signal booster device 1 is shut down after only one oscillation 20 occurs a weighting function is preferably introduced. If a weighting function is used, it is also part of the step S6.

The weighting function operates as follows. The control unit 10 comprises a counter that is initialized. If a power ratio or the difference between two measured signal powers exceeds the threshold the counter is increased by a first number X. If the power ratio or the difference between two measured signal powers is smaller than the threshold the counter is decreased by a second number Y. Only if the counter reaches a predefined number an oscillation 20 will be recognized. Then the gain of the amplifiers 8a, 8b is reduced or the amplifiers 8a, 8b are shut down completely. It would also be possible that the counter is decreased by the first number X when the result of the correlation exceeds the threshold. In accordance, the counter would be increased by the second number Y when the result of the correlation is less than the threshold.

Preferably, the first number X differs from the second number Y. For example when the threshold is exceeded (power ratio or difference is larger than a threshold) then the counter is increased by value of one. Otherwise the counter is decreased by a number of two. Preferably the first number is smaller than the second number. However, both numbers X, Y could also be of the same size or the second number Y could even be smaller than the first number X.

It would also be possible that after the counter reaches a first predefined number that the control unit 10 reduces the gain of all or at least the transmit amplifier 8a, 8b and the counter is reset. If the counter reached again the (a second) predefined number the control unit 10 decides to finally shut down the signal booster device 1 at all.

It is clear that the counter could also operate in the opposite direction. For example if the threshold is exceeded the counter could be reduced by a first number, wherein otherwise the counter could be increased by a second number.

It should also be understood that any other weighting functions may incorporated herein.

When the control unit 10 decides to shut down the amplifiers 8a, 8b a bypass-line 13 should be enabled to electrically connect the at least one first antenna 4a to the at least one second antenna 4b.

After an oscillation 20 has been detected the amplifiers 8a, 8b are preferably shut down for at least a minute. After five oscillations 20 have been detected in a row the amplifiers 8a, 8b are preferably shut down until the signal booster device 1 reboots.

The control unit 10 is able to repeat the aforementioned steps S1 to S6 in a predetermined interval. This interval is preferably set to less than 60 ms, preferably less than 50 ms or less than 40 ms or less than 30 ms or less than 20 ms wherein the interval is preferably set higher than 5 ms, preferably set higher than 10 ms or higher than 20 ms or higher than 30 ms or higher than 40 ms or higher than 50 ms.

The aforementioned method also works for low and high power downlink/uplink signals. For example, a low power downlink signal has a signal strength ≤−50 dBm, wherein a high power downlink signal has preferably a signal strength ≥−50 dBm. Furthermore, a low power uplink signal has preferably a signal strength ≤−9 dBm, wherein a high power uplink signal has preferably a signal strength ≥−9 dBm. A high power signal is available during an ongoing data communication between the mobile 2 and the base station 3.

FIG. 4 shows also the steps S1A and S1B which can be executed optionally. Within step S1A the signal power of the signal is determined before any oscillations 20 are to be detected. Within this step it can be determined whether a low power or a high power uplink/downlink signal is available and what type this signal is of (i.e. GSM, UMTS or LTE). Depending on the detected signal power the step S1B or S1 is executed in the following.

Step S1B is preferably executed but not limited to when a high power signal is detected within step S1A. Within step S1A another amplification factor is set. The another amplification factor is chosen in such a way that the operation gain of the signal booster device 1 is reduced compared to the normal operation gain. Thus, the another amplification factor is lower than the first amplification factor. This mode of operation is shown within the time interval $t_2$ in FIG. 3A.

It is also possible that step S1B is executed without executing step S1A in the first place. After executing step S1B, step S1 is executed and the first signal power is measured. As a result, the difference between the first signal power and the second signal power is higher thereby allowing the detection of an oscillation more accurately.

Figure 5:
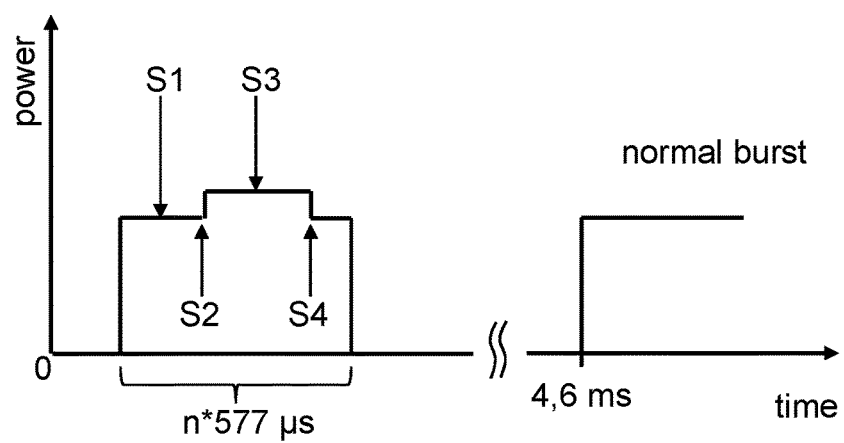
FIG. 5: shows a normal GSM burst and a GSM burst with an alternation of the amplification factor.

FIG. 5 shows a normal GSM burst and a GSM burst with an alternation in the operation gain. A GSM burst has a length of 577 μsec. Within the first quarter or the first third of the GSM burst the first signal power is determined (step S1). Afterwards the operation gain is increased by setting the second amplification factor (step S2). Preferably after 50% of the GSM burst the second signal power is determined (step S3). Preferably in the last third or quarter of the GSM burst the operation gain is set back to the initial (normal) operation gain (step S4).

As described above it is clear that the first amplification factors differ from each other depending on the signal (low/high power and/or uplink/downlink signal and/or signal type). The same is also true for the second amplification factors.

The difference between the first and the second amplification factors is higher when the signal has a higher power level. Preferably the second amplification factor is higher than the first amplification factor.

The first amplification factor and the second amplification factor are chosen in such a way that the signal being amplified with the first amplification factor falls into the lower end of the measurement range of the A/D-converter and that the signal being amplified with the second amplification factor falls into the upper end of the measurement range of the A/D-converter. It is possible to use more than one A/D-converter. When using a plurality of A/D-converters the preferably have different voltage references. It is also possible to use several voltage references with one A/D-converter. Depending on the type of signal (low/high power and/or uplink-/downlink signal and/or signal type) the suitable A/D-converter and/or voltage reference is used.

The control unit 10 is probably configured to update the status of the signal booster device 1 in an interval less than 200 ms, preferably less than 150 ms or less than 100 ms or 75 ms or 50 ms or 40 ms or 30 ms or 20 ms. Preferably the control unit 10 is able to update the status in an interval higher than 5 ms, preferable higher 10 ms or higher than 20 ms or higher than 30 ms or higher than 40 ms or higher than 50 ms.

Using the aforementioned described methods as well as the described signal booster device 1 it is possible to detect an oscillation 20 within a signal booster device 1 before the oscillation 20 reaches a level 12 dB above the noise floor 21. Furthermore the oscillation 20 is detected preferably in less than 300 milliseconds in the uplink signal and in less than 1 second in the downlink signal.

The invention is not limited to the described embodiments. In the context of the invention, all described and/or indicated features can be freely combined with each other.

The invention claimed is:

1. A method for detecting and handling oscillations in a signal booster device in a wireless communication network,
   wherein the signal booster device comprises at least one first antenna for communicating with a mobile and at least one second antenna for communicating with a base station and at least one amplifier,
   wherein the signal booster device comprises at least one power detector arranged in between the at least one first antenna and the at least one second antenna,
   wherein the signal booster device is configured to adjust a gain between the at least two antennas by altering the amplification factor of the signal booster device,
   wherein a normal operation gain is achieved by setting the amplification factor of the signal booster device to a first amplification factor and wherein the method comprises the following steps for detecting an oscillation:

determining at least one first signal power by using the at least one power detector, increasing the operation gain of the signal booster device by setting the amplification factor to a second amplification factor, wherein the second amplification factor is higher than the first amplification factor, determining at least one second signal power by using the at least one power detector, correlating the at least one first signal power with the at least one second signal power; and determining whether a status of the signal booster device is oscillation or normal based upon the result of the correlation;

wherein the correlation comprises calculating a power ratio based on the at least one first signal power and the at least one second signal power or calculating a difference between the at least one first signal power and at least one second signal power; and wherein the status of the signal booster device is oscillation when the power ratio or the difference exceeds a threshold or is less than a threshold and wherein the status is normal when the power ratio or the difference is less than the threshold or exceeds a threshold.

2. The method of claim 1, wherein the operation gain is increased above the normal operation gain by increasing the amplification factor of the at least one amplifier and/or wherein the signal booster device comprises at least one attenuator arranged between the at least one first antenna and the at least one second antenna and wherein the operation gain is increased above the normal operation gain by reducing the attenuation factor of the at least one attenuator.

3. The method of claim 1, wherein the method comprises the following step being executed before the step determining at least one first signal power:

decreasing the operation gain of the signal booster device by setting the amplification factor to another amplification factor wherein the another amplification factor is lower than the first amplification factor.

4. The method of claim 3, wherein the operation gain is decreased below the normal operation gain by decreasing the amplification factor of the at least one amplifier and/or wherein the signal booster device comprises at least one attenuator arranged between the at least one first antenna and the at least one second antenna and wherein the operation gain is decreased below the normal operation gain by increasing the attenuation factor of the at least one attenuator.

5. The method of claim 1, wherein the second amplification factor is chosen in such a way that the at least one first signal power falls into a lower end of a measurement range and that the at least one second signal power falls into an upper end of a measurement range.

6. The method of claim 1, wherein the at least one power detector is arranged in and/or coupled to a downlink-path and/or wherein the at least one power detector is arranged in and/or coupled to an uplink path and wherein the operation gain is set independently for the uplink path and the downlink path.

7. The method of claim 1, wherein the first amplification factor and/or the second amplification factor are different from each other and/or are set independently from each other depending whether the signal is an uplink-signal or a downlink-signal.

8. The method of claim 7, wherein a counter is increased or decreased by a first number upon detecting an oscillation and wherein the gain of all or at least of the transmit amplifier within the signal booster device is reduced or wherein all or at least the transmit amplifier is disabled after the counter reaches a predefined number.

9. The method of claim 8, wherein a counter is decreased or increased by a second number if a detection of an oscillation failed.

10. The method of claim 9, wherein the first and the second numbers are the same or wherein both numbers differ from each other.

11. The method of claim 1, wherein the method comprises the following steps:

Repeating the former steps in a predetermined interval.

12. The method of claim 1, wherein when an oscillation is detected and all or at least the transmit amplifiers are disabled, a bypass is enabled to electrically connect the at least one first antenna directly to the at least one second antenna.

13. The method of claim 1, wherein the signal is a Global System for Mobile communication (GSM) or a Universal Mobile Telecommunications Service (UMTS) or a Long Term Evolution (LTE) signal.

14. A signal booster device for amplifying signals in a wireless communication network, comprising:

at least one first antenna for communicating with a mobile and at least one second antenna for communicating with a base station, a first duplexer and a second duplexer, each of the first duplexer and second duplexer having at least two signal-line-ports, a downlink signal path and an uplink signal path split up into two separated electrical lines by the first and second duplexer, wherein the two electrical lines run between the first signal-line-ports and the second signal-line-ports of the first and the second duplexer, whereby the at least one first antenna is connected to a third connecting port of the first duplexer and wherein the at least one second antenna is connected to a third connecting port of the second duplexer, at least one first amplifier arranged within the downlink signal path and at least one second amplifier is arranged within the uplink signal path, at least one power detector for detecting the signal power in the downlink and/or uplink path, and a control unit configured to change the operation gain of the signal booster device;

wherein the control unit is configured to adjust a gain between the at least one first antenna and the at least one second antenna by altering the amplification factor, wherein a normal operation gain is achieved by setting the amplification factor to a first amplification factor and wherein the control unit is configured to:

determine at least one first signal power by using the at least one power detector, increase the operation gain of the signal booster device by setting the amplification factor to a second amplification factor, wherein the second amplification factor is higher than the first amplification factor, determine at least one second signal power by using the at least one power detector, correlate the at least one first signal power with the at least one second signal power; and determine whether a status of the signal booster device is oscillation or normal based upon the result of the correlation; and wherein the control unit is configured to increase or decrease a counter by a first number upon the detection of the status of the signal booster device is oscillation, and when the counter reaches a predefined number, the control unit is configured to reduce the gain of all or at least of the transmit amplifier within the signal booster device or is configured to disable all or at least the transmit amplifier within the signal booster device.

15. The signal booster device of claim 14, wherein the correlation comprises a calculation of a power ratio based on the at least one first signal power and the at least one second signal power or a calculation of a difference between the at least one first signal power and at least one second signal power and wherein the status of the signal booster device is oscillation when the power ratio or the difference exceeds a threshold or is less than a threshold and wherein the status is normal when the power ratio or the difference is less than the threshold or exceeds a threshold.

16. The signal booster device of claim 14, wherein the control unit is configured to increase the operation gain above the normal operation gain by increasing the amplification factor of the at least one amplifier and/or wherein the signal booster device comprises at least one attenuator arranged between the at least one first antenna and the at least one second antenna and wherein the control unit is configured to increase the operation gain above the normal operation gain by reducing the attenuation factor of the at least one attenuator.

17. The signal booster device of claim 16,
wherein the at least one attenuator is arranged between the at least one first antenna and the first duplexer and/or between the at least one second antenna and the second duplexer, and/or
wherein the at least one power detector is arranged between the first and the second duplexer within
a) the downlink signal path; and/or
b) the uplink signal path.

18. The method of claim 14, wherein the control unit is configured to decrease the operation gain of the signal booster device before the at least one first signal power is determined by setting the amplification factor to another amplification factor wherein the another amplification factor is lower than the first amplification factor.

19. The signal booster device of claim 18, wherein the control unit is configured to decrease the operation gain below the normal operation gain by decreasing the amplification factor of the at least one amplifier and/or wherein the signal booster device comprises at least one attenuator arranged between the at least one first antenna and the at least one second antenna and wherein the control unit is configured to decrease the operation gain below the normal operation gain by increasing the attenuation factor of the at least one attenuator.

20. The signal booster device of claim 14, wherein the control unit is configured to set the second amplification factor in such a way that the at least one first signal power falls into lower end of a measurement range and that the at least one second signal power falls into the upper end of a measurement range.

21. The signal booster device of claim 14, wherein the control unit is configured to continuously determining the status of the signal booster device.

22. The signal booster device of claim 14, wherein the control unit is configured to decrease or increase the counter by a second number if a detection of an oscillation failed.

23. The signal booster device of claim 22, wherein the first and the second numbers are the same or wherein both numbers differ from each other.

24. A means of transportation particularly a vehicle, a ship, a train or a plane, wherein the means of transportation comprises a signal booster device according to claim 14, wherein the at least one first antenna is arranged within the means of transportation and wherein the at least one second antenna is arranged on the outside of the means of transportation.

25. A signal booster device for amplifying signals in a wireless communications network, comprising:
at least one first antenna for communicating with a mobile and at least one second antenna for communicating with a base station,
a first duplexer and a second duplexes each of the first duplexer and second duplexer having at least two signal-line-ports,
a downlink signal path and an uplink signal path split up into two separated electrical lines by the first and second duplexer, wherein the two electrical lines run between the first signal-line-ports and the second signal-line-ports of the first and the second duplexer, whereby the at least one first antenna is connected to a third connecting port of the first duplexer and wherein the at least one second antenna is connected to a third connecting port of the second duplexer,
at least one first amplifier arranged within the downlink signal path and at least one second amplifier is arranged within the uplink signal path,
at least one power detector for detecting the signal power in the downlink and/or uplink path, and
a control unit configured to change the operation gain of the signal booster device;
wherein the control unit is configured to adjust a gain between the at least one first antenna and the at least one second antenna by altering the amplification factor, wherein a normal operation gain is achieved by setting the amplification factor to a first amplification factor and wherein the control unit is configured to:
determine at least one first signal power by using the at least one power detector
increase the operation gain of the signal booster device by setting the amplification factor to a second amplification factor, wherein the second amplification factor is higher than the first amplification factor,
determine at least one second signal power by using the at least one power detector,
correlate the at least one first signal power with the at least one second signal power; and
determine whether a status of the signal booster device is oscillation or normal based upon the result of the correlation,
wherein the signal booster device comprises a bypass line for directly electrically connecting the at least one first antenna to the at least one second antenna, wherein the control unit is configured to enable the bypass line when the status of the signal booster device is oscillation.

26. A means of transportation particularly a vehicle, a ship, a train or a plane, wherein the means of transportation comprises a signal booster device according to claim 25, wherein the at least one first antenna is arranged within the means of transportation and wherein the at least one second antenna is arranged on the outside of the means of transportation.

27. The signal booster device of claim 25, wherein the correlation comprises a calculation of a power ratio based on the at least one first signal power and the at least one second signal power or a calculation of a difference between the at least one first signal power and at least one second signal power and wherein the status of the signal booster device is oscillation when the power ratio or the difference exceeds a threshold or is less than a threshold and wherein the status is normal when the power ratio or the difference is less than the threshold or exceeds a threshold.

28. The signal booster device of claim 25, wherein the control unit is configured to increase the operation gain above the normal operation gain by increasing the amplification factor of the at least one amplifier and/or wherein the signal booster device comprises at least one attenuator arranged between the at least one first antenna and the at least one second antenna and wherein the control unit is configured to increase the operation gain above the normal operation gain by reducing the attenuation factor of the at least one attenuator.

29. The signal booster device of claim 28,
wherein the at least one attenuator is arranged between the at least one first antenna and the first duplexer and/or between the at least one second antenna and the second duplexer, and/or
wherein the at least one power detector is arranged between the first and the second duplexer within
a) the downlink signal path; and/or
b) the uplink signal path.

30. The method of claim 25, wherein the control unit is configured to decrease the operation gain of the signal booster device before the at least one first signal power is determined by setting the amplification factor to another amplification factor wherein the another amplification factor is lower than the first amplification factor.

31. The signal booster device of claim 30, wherein the control unit is configured to decrease the operation gain below the normal operation gain by decreasing the amplification factor of the at least one amplifier and/or wherein the signal booster device comprises at least one attenuator arranged between the at least one first antenna and the at least one second antenna and wherein the control unit is configured to decrease the operation gain below the normal operation gain by increasing the attenuation factor of the at least one attenuator.

32. The signal booster device of claim 25, wherein the control unit is configured to set the second amplification factor in such a way that the at least one first signal power falls into lower end of a measurement range and that the at least one second signal power falls into the upper end of a measurement range.

33. The signal booster device of claim 25, wherein the control unit is configured to continuously determining the status of the signal booster device.

* * * * *